United States Patent [19]

Burkhardt et al.

[11] Patent Number: 4,645,382
[45] Date of Patent: Feb. 24, 1987

[54] METHOD FOR THE ISOLATION OF POLLUTANTS IN SOIL STRATA

[75] Inventors: Rudolf Burkhardt; Hansjürgen Hass, both of Troisdorf, Fed. Rep. of Germany

[73] Assignee: Dynamit Nobel AG, Cologne, Fed. Rep. of Germany

[21] Appl. No.: 765,555

[22] Filed: Aug. 12, 1985

Related U.S. Application Data

[63] Continuation of Ser. No. 598,987, Apr. 11, 1984, abandoned.

[30] Foreign Application Priority Data

Apr. 12, 1983 [DE] Fed. Rep. of Germany ....... 3313034

[51] Int. Cl.$^4$ .......................... C09K 17/00; E02D 3/12
[52] U.S. Cl. .................... 405/264; 252/315.2; 252/315.5; 252/633; 405/270; 422/900
[58] Field of Search ................. 252/315.2, 315.5, 633; 405/128, 129, 264, 270; 422/900; 523/131

[56] References Cited

U.S. PATENT DOCUMENTS

| | | | |
|---|---|---|---|
| 3,213,031 | 10/1965 | Heinemann et al. | 252/633 X |
| 3,593,799 | 7/1971 | Boughton et al. | 405/264 X |
| 3,630,762 | 12/1971 | Olton et al. | 252/315.5 X |
| 3,704,594 | 12/1972 | Davis | 405/264 |
| 4,056,937 | 11/1977 | Suzuki | 405/264 |
| 4,074,536 | 2/1978 | Young | 405/264 |
| 4,316,807 | 2/1982 | McDaniel et al. | 252/315.2 X |

Primary Examiner—Richard D. Lovering
Attorney, Agent, or Firm—Felfe & Lynch

[57] ABSTRACT

Liquid or water-soluble pollutants which have entered into permeable soil strata are prevented from spreading and contaminating ground water by surrounding the contaminated zone on all sides with vertical barriers and closed off at the bottom by a horizontal injected floor which seals not only against water but also against the pollutants. The pollutant resistance of the floor is achieved by the use of injection materials on a silicate basis containing trialkoxysilanes of the general formula $R-Si(OR')_3$.

8 Claims, 2 Drawing Figures ns Ser. 598,987, filed Apr. 11, 1984, and now abandoned.

METHOD FOR THE ISOLATION OF POLLUTANTS IN SOIL STRATA

This application is a continuation of application Ser. No. 598,987, filed Apr. 11, 1984, and now abandoned.

BACKGROUND OF THE INVENTION

The subject matter of the present invention is a method for the isolation of pollutants in permeable soils by the installation of sealing material around the endangering zone.

It is known that the penetration of pollutants into soils, especially sandy, permeable soils, contaminates the ground water and thus can constitute a threat to potable water supplies. The penetration of such water-polluting liquids is often the unavoidable consequence of accidents, but may also be due to improper dumping done in times past, so that measures must be taken to stop further penetration.

Particularly great is the threat of ground water contamination by nonaqueous liquids of greater specific weight, such as chlorinated hydrocarbons, for example, which sink all the way to the bottom of the aquifer, and by soluble substances, such as phenols and aqueous pollutant solutions which immediately dissolve upon entering the ground water and result in high pollutant concentrations.

The technical and economic shortcomings of the remedial measures commonly taken heretofore—such as excavating and removing soil layers, lowering the ground water level by installing barriers in the ground and pumping out the pollutant solutions—as well as their risks, have led to the development of various methods which are based mostly on fixing the pollutants in place. This is intended to prevent the propagation of pollutants into the subsoil and ground water. These methods include, for example:

1. The transformation of soluble pollutants to insoluble substances by injecting a reactive substance into the area of the pollution. The application of this method, which was developed for the fixation of radioactive and highly toxic substances, to less dangerous pollutants is opposed on the grounds that it adds still another reactive chemical to the ground water.

2. The injection of solidifying agents and sealing agents into the polluted zone for the purpose of fixing the pollutants in place (microencapsulation).

3. Closing off the polluted zone with an impermeable vertical barrier containing bentonite or clay (sealing barrier) which is bonded at the bottom with the bottom of the aquifer, which is usually a dense clay lever (macroencapsulation) (cf. Spooner, Wetzel, Grube, Proc. 3rd Nat. Conf. on Management of Uncontrolled Waste Sites, Washington, 1982, page 195).

To fix the pollutants in place, the two last-named methods use injections and sealing barrier compositions, which provide a sufficient seal against water, but do not have the capacity to seal aqueous pollutant solutions or various organic liquids, such as chlorinated hydrocarbons and their aqueous solutions, and do not have sufficient stability (cf. loc. cit. page 167).

SUMMARY OF THE INVENTION

The problem was therefore to develop a sealing system suitable for the containment of pollutants in permeable soils, which will be virtually impermeable not only to water but also to liquid, nonaqueous pollutants and aqueous pollutant solutions.

As a solution to this problem, a method has now been discovered for the isolation of water supply endangering pollutants in permeable soils by the installation of sealing material around the endangering area, which is characterized in that the barriers surrounding the polluted area and extending all the way into the aquiferous soil strata, largely preventing the entry of ground water, are joined by a bottom-sealing injected floor which blocks off not only water but also liquid pollutants. This method is of special advantage in the treatment of sandy alluvial soils.

The term "injected floor," as used in connection with the invention, is to be understood to means a stratum of about 1 m in thickness installed by known methods, which consists essentially of alkali silicates which contain admixed alkyl alkoxysilanes. The term, "alkali silicates," is to be understood in this case as the potassium silicates, and especially sodium silicates, known as water glasses. Depending on how they are manufactured, they are aqueous solutions with varying contents of alkali oxide and silica. They are therefore used as such aqueous solutions, it being preferred to use concentrated solutions of a density $d_4^{20}$ of about 1.25 to 1.40 (corresponding to 30° to 43° Baumé). It is alsso possible, however, depending on the desired gelling time, to use more dilute solutions.

The alkali silicate solutions contain as gelling agents trialkoxysilanes of the formula R-Si (OR')$_3$, R representing an aliphatic moiety of 1 to 6 carbon atoms and R' identical or different alkyl moieties of 1 to 4 carbon atoms, which can be interrupted, if desired, by an oxygen atom, for example $R^1 = -(CH_2)_2-O-C_2H_5$. Preferred trialkoxysilanes are n-propyl, isopropyl and isobutyl alkoxysilanes. Some of the alkoxy groups, if desired, can also be in hydrolyzed form as hydroxyl groups.

The amount of silane in the mixture forming the injected floor depends on the molecular weight of the silane, on the silica content of the water glass solution, and on the desired setting time of the mixture. For mixtures containing 10 to 90% water glass solution by volume, of 30° to 40° Baumé ($d_4^{20}$=1.25 to 1.4), and having setting times of 30 to 50 minutes, it amounts to 10 to 140 grams per liter of mixture, corresponding to a molar ratio of silane to silica of (0.05 to 0.28):1. Generally, a higher silica content of the water glass solution requires a higher amount of the trialkoxysilane and a higher molecular weight of the silane requires a longer setting time. The installation of the setting mixture of water glass and alkyl alkoxysilanes in soils is performed in a known manner with the aid of known apparatus for soil injection and established techniques in sealing barrier construction. These procedures can be carried out from the ground surface. The injections must be performed such that a horizontal, or approximately horizontal, layer of the injection material is formed below the site of the damage and seals tightly to the vertical sealing barriers previously installed. These vertical walls can consist of sealing material known in itself, which has a sufficient sealing action against ground water, but has no adequate sealing action against various organic liquids or aqueous pollutant solutions, or has insufficient stability against such liquids and solutions, respectively.

When the procedure of the invention is used, no ground water can, to any appreciable extent, penetrate in the horizontal direction into the area containing the pollutant, and the pollutant, or a solution containing the pollutant, is unable to escape downwardly into the ground water.

It is therefore also possible, in accordance with the invention, to extend the vertical walls, not all the way down into the bottom of the aquifer, but only to the same depth as the zone of pollution, and then at this depth to establish the horizontal connection to the injected floor of the invention.

In accordance with the invention, furthermore, it is also possible to veil the vertical walls on the inside and, if desired, the outside, with the mixture of water glass and alkyl alkoxysilanes, in order to seal the vertical walls, too, against the escape of pollutant solutions or liquids. In this case, dilute water glass solutions can also be used, having lower silane contents, accordingly. The usual thickness of the so-called curtain produced by this method is between 30 and 100 cm measured from the vertical wall.

The process of the invention is suitable for use in cases of accidents caused by nonaqueous liquids of low specific gravity, such as mineral oils or tar oils, or their distillation products and residues, or by seepage from surface deposits including dumps, and in cases of accidents caused by pollutants of high specific gravity or water-soluble pollutants which might penetrate, for example, through the bottom of an upper aquifer into secondary aquifers. In the last-mentioned case, the injected floor is produced on the bottom surface of the upper aquifer.

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter.

DESCRIPTION OF PREFERRED EMBODIMENT

From the results of the permeability tests to be described below, it is apparent that, by the injection of substances containing alkali metal silicates (water glass) and trialkoxysilanes, a seal against water is achieved, as well as resistance to pollutants, while by the injection of known sealing agents, however, only one or the other of these two objectives is achieved.

Figure 1:
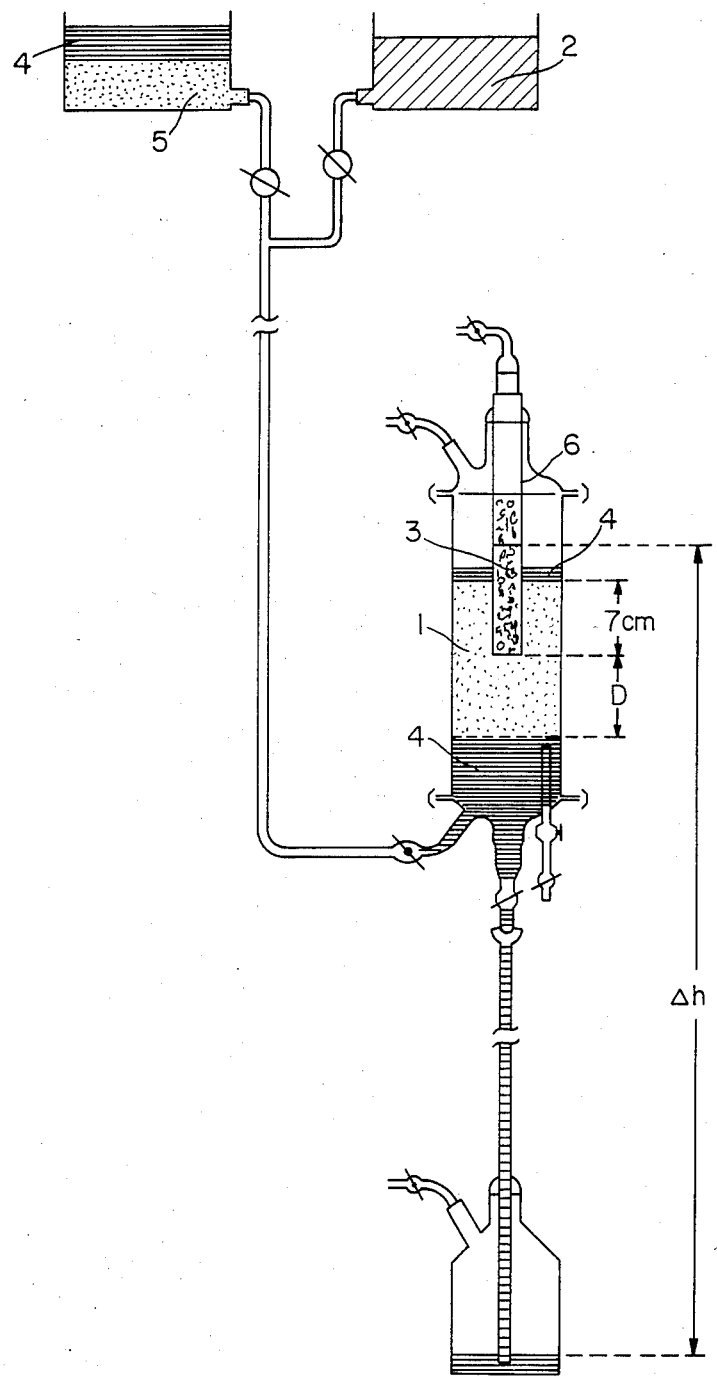
FIG. 1 shows an arrangement of laboratory apparatus suitable for testing of the invention.

A laboratory apparatus suitable for the requirements, which is shown in FIG. 1, was used in performing the tests. The injection substance 2 and water 4, respectively, are forced into the sand fill 1 from the bottom under light pressure; sand as such or mixed with the bentonite suspension is poured in from the top. After 24 hours of letting the gels solidify or soaking the bentonite, the sealed sand is loaded with the pollutant 3 or water 4, filtered through a sand layer 5. The loading was performed under a hydraulic gradient I=approximately 16, which was produced, not by positive pressure, but by negative aspiration from a water column, in order to be able also to test pollutants of low specific gravity floating on water in the same apparatus.

The experimental arrangement corresponded to a case in which the pollutant has already penetrated to the surface of the injected floor.

Figure 2:
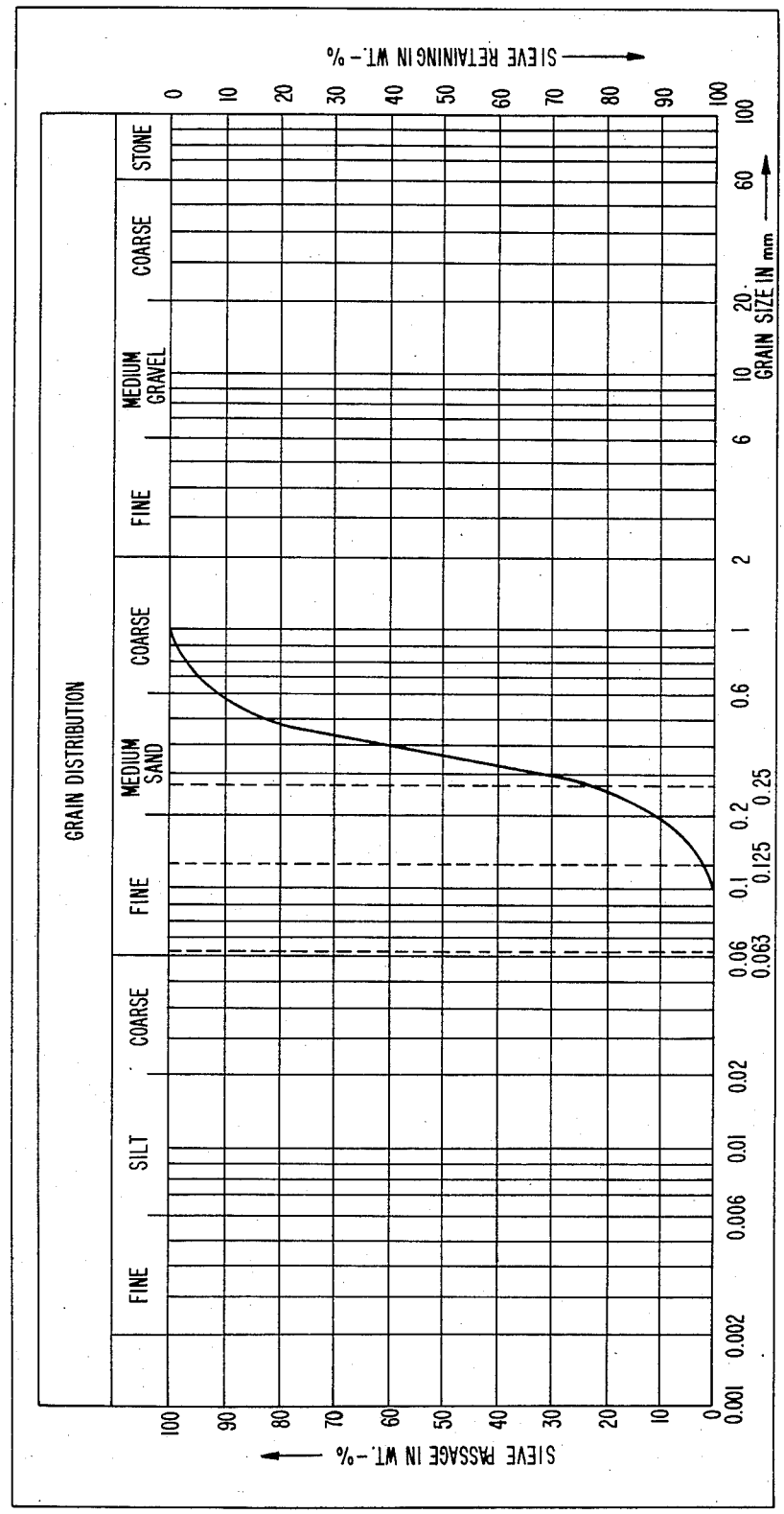
FIG. 2 shows the grain size distribution of the permeable soil used in testing of the invention.

All of the experiments were performed with the same medium sand, grain-size distribution as in FIG. 2, using approximately the same hydraulic gradient (I=16±0.5) in order to obtain comparable test results. Measurement was made of the drop of the liquid level in the pollutant tube 6, which corresponds to the amount that has escaped.

The permeability coefficient k given in the examples was calculated on the basis of the simplified Darcy equation, $k=(Q/F.I)$ cm/sec, wherein:

Q=rate of seepage in cubic cm per sec.;
F=filter area in sq cm;
$\Delta h$=height of water column in cm=124 to 132 cm;
D=thickness of permeated layer in cm=8 cm; and
I=hydraulic gradient=$\Delta h/D$.

$\Delta h$ and D can be seen in FIG. 1. Since the cross section of the sealed sand increases from the entry to the exit of the liquid, the average filter surface F was reckoned at 33.2 square centimeters.

EXAMPLE 1

The measuring apparatus was filled with sand 1 as represented in FIG. 1, and an injection solution 2 was forced into it from the bottom. The injection solution 2 was prepared by mixing 300 ml of sodium silicate solution of 37/40°Bé, 1600 ml of water, and 100 ml (93 g) of n-propyltrimethoxysilane, and stirring for 15 minutes. After the solution has hardened, the gel was removed from the bottom fourth of the apparatus and replaced by water. After 24 hours, the pollutant tube was filled with water or the pollutant in question, and the lowering of its level was recorded daily over a period of about 5 to 8 weeks, while the hydraulic gradient was kept constant by liquid level control. The average rates of flow and permeability coefficients k given in the following table show a very good seal against water and aqueous pollutant solutions, and a virtually complete impermeability to nonaqueous pollutants.

| Permeability of sand sealed with silane-silicate solution | | | | |
| --- | --- | --- | --- | --- |
| Pollutant | Gradient I | Length of test (days) | Seepage rate (avg. ml/day) | k (cm/sec) |
| Water | 16 | 55 | 0.57 | $1.25 \times 10^{-8}$ |
| Phenol, 8.4% in water | 16.5 | 33 | 0.39 | $8.5 \times 10^{-9}$ |
| 0.1N sulfuric acid | 16.5 | 48 | 0.21 | $4.4 \times 10^{-9}$ |
| Diesel oil | 16 | 40 | 0* | 0 |
| Trichloroethylene | 16 | 41 | 0* | 0 |
| Perchloroethylene | 16 | 56 | 0* | 0 |

*Only in the first 1 to 4 days did small amounts of the liquid penetrate superficially into the sealed sand, but no more after that.

EXAMPLE 2

Performed as in Example 1, but with the use of an injection solution 1 which was prepared by mixing 300 ml of sodium silicate solution of 37/40° Bé, 17 ml of water and 60 g (65 ml) of isobutyltrimethoxysilane, and stirring for 20 minutes.

The sand layer sealed with this solution was loaded with perchloroethylene for 76 days under a hydraulic gradient of I=16. During the first 2 days, 4.3 ml of perchloroethylene penetrated into the sand layer, but no more thereafter.

COMPARATIVE EXAMPLE 1

Under the same conditions, barriers were produced with known injection mixtures on a basis of water glass, and were tested. For these tests the following injection solutions were prepared:

(A) Sodium aluminate-water glass mixture containing 15% water glass by volume, by mixing 300 ml of sodium silicate solution of 37/40° Bé with 1670 ml of water and 30 ml (46.2 g) of sodium aluminate solution (25% alumina, 19% sodium oxide), (B) Sodium aluminate-water glass mixture containing 20% water glass by volume, by mixing 400 ml of water glass solution with 1565 ml of water and 35 ml (54 g) of sodium aluminate solution, (C) Ester-water glass mixture containing 40% water glass by volume, by mixing 800 ml of water glass solution with 1120 ml of water and 80 ml (96 g) of a commercial mixture of the dimethyl esters of adipic, glutaric, and succinic acid, and stirring for 15 minutes, with the addition of 2 g of an anionic emulsifier (alkylbenzene sulfonate).

| Substance Injected | Pollutant | Gradient I | Duration of Test (days) | Seepage (avg. ml/day) | $k$ (cm/sec) |
|---|---|---|---|---|---|
| A | water | 16 | 43 | 10.2 | $2.2 \times 10^{-7}$ |
|   | perchloroethylene | 16 | 3 | 166.6* | (break-through) |
| B | water | 16 | 61 | 3.4 | $7.4 \times 10^{-8}$ |
|   | perchloroethylene | 16.5 | 3 | 163.3* | (break-through) |
| C | water | 16 | 54.4 h | 734.9 | $1.6 \times 10^{-5}$ |
|   | trichloroethylene | 16 | 63.6 h | 5.5 | $1.2 \times 10^{-7}$ |

*Initially the seepage was slight, but increased sharply after 1 to 2 days until break-through (more than 100 ml/h) occurred.

COMPARATIVE EXAMPLE II

To test the sealing action of bentonite, the bentonite, together with the sand and an amount of water sufficient for filling the pores, was poured down into the test vessel. The injection of a bentonite suspension from the bottom was not possible in this case on account of the pressure that was required. The ratio of the dry weights of bentonite to sand was selected at a very high level in order to achieve sufficient sealing against water.

The measurements, which were performed after soaking the bentonite for 2 days, at a gradient $I=16$, were as follows: water: seepage averaging 25.8 ml/day, corresponding to $k=5.6\times10^{-7}$; trichloroethylene: seepage averaging 356 ml/day, corresponding to $k=7.8\times10^{-6}$.

While the permeability to water slightly diminished in the course of the test, it increased considerably for trichloroethylene, and after only 85 hours, reached a k of $1.1\times10^{-5}$. The requirements of a sufficient and lasting seal were thus not satisfied.

It will be understood that the specification and examples are illustrative but not limitative of the present invention and that other embodiments within the spirit and scope of the invention will suggest themselves to those skill in the art.

What is claimed is:

1. A method for the isolation of ground-water-endangering pollutants in permeable soils by the installation of sealing barriers around the endangering zone, comprising joining vertical barriers which surround the polluted zone and extend to a depth that is polluted and largely prevent the passage of escaping ground water with a horizontal injected floor which seals as a bottom against water and liquid pollutants, said horizontal injected floor being substantially impermeable to water and liquid pollutants and being produced by the injection of a gel-forming mixture of alkali metal silicate, which contains at least one alkyl trialkoxysilane of the general formula R-Si(OR')$_3$, wherein R represents an alkyl moiety of 1 to 6 carbon atoms and R' represents identical or different alkyl moieties of 1 to 4 carbon atoms, which can be interrupted, if desired, by an oxygen atom, and/or contains hydrolysis products of at least one trialkoxysilane.

2. The method of claim 1, wherein the vertical barriers in the ground-water zone are reinforced by adjacent vertical sealing coats of the mixture forming the injected floor.

3. The method of claim 1, wherein the alkali metal silicate is sodium silicate or potassium silicate.

4. The method of claim 3, wherein the trialkoxysilane is n-propyl, isopropyl and isobutyl alkoxy silane.

5. The method of claim 1, wherein the vertical barriers extend into the aquifers.

6. The method of claim 5, wherein the alkali metal silicate is sodium silicate or potassium silicate.

7. The method of claim 6, wherein the trialkoxysilane is n-propyl, isopropyl and isobutyl alkoxysilane.

8. The method of claim 5, wherein the vertical barriers in the ground-water zone are reinforced by adjacent vertical sealing coats of the mixture forming the injected floor.

* * * * *